US012764282B2

(12) United States Patent
Gao et al.

(10) Patent No.: US 12,764,282 B2
(45) Date of Patent: Oct. 13, 2026

(54) IMAGE ENCODING METHOD OF ENCODING A FIRST IMAGE GENERATED IN ACCORDANCE WITH IMAGE USAGE, AND IMAGE DECODING METHOD OF GENERATING A SECOND IMAGE BY APPLYING A FILTER SELECTED BASED ON IMAGE USAGE TO THE FIRST IMAGE

(71) Applicant: Panasonic Intellectual Property Corporation of America, Torrance, CA (US)

(72) Inventors: Jingying Gao, Singapore (SG); Han Boon Teo, Singapore (SG); Chong Soon Lim, Singapore (SG); Praveen Kumar Yadav, Singapore (SG); Kiyofumi Abe, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/945,959

(22) Filed: Nov. 13, 2024

(65) Prior Publication Data

US 2025/0071272 A1 Feb. 27, 2025

Related U.S. Application Data

(63) Continuation of application No. PCT/JP2023/017508, filed on May 10, 2023.

(Continued)

(51) Int. Cl.

*H04N 19/117* (2014.01)
*H04N 19/44* (2014.01)
*H04N 19/86* (2014.01)

(52) U.S. Cl.

CPC ........... *H04N 19/117* (2014.11); *H04N 19/44* (2014.11); *H04N 19/86* (2014.11)

(58) Field of Classification Search

CPC ....... H04N 19/117; H04N 19/44; H04N 19/86

(Continued)

(56) References Cited

U.S. PATENT DOCUMENTS 5,438,374 A * 8/1995 Yan ........................ H04N 19/80 375/E7.193
9,883,207 B2 1/2018 Misra et al.

(Continued)

FOREIGN PATENT DOCUMENTS

AU 2023306696 A2 * 3/2025 ..... H04N 21/440245
JP 2002041097 A * 2/2002 ............. G10L 19/02

(Continued)

OTHER PUBLICATIONS

Extended European Search Report issued Jul. 9, 2025 in European Patent Application No. 23807505.5.

(Continued)

*Primary Examiner* — Justin W Rider
(74) *Attorney, Agent, or Firm* — Wenderoth, Lind & Ponack, L.L.P.

(57) ABSTRACT

An image decoding device includes circuitry and a memory connected to the circuitry, in which in operation, the circuitry acquires a first image and a plurality of first filter sets by decoding a bitstream, generates and outputs a second image by selecting one first filter set from the plurality of first filter sets based on usage information indicating an image usage, and applying the first filter set having been selected to the first image.

9 Claims, 22 Drawing Sheets

EXAMPLE OF INPUT IMAGE INCLUDING PEDESTRIAN

EXAMPLE OF TRACKING TASK OF OBJECT

EXAMPLE OF ACTION RECOGNITION

EXAMPLE OF POSE ESTIMATION TASK

Related U.S. Application Data

(60) Provisional application No. 63/342,736, filed on May 17, 2022.

(58) Field of Classification Search
USPC .................................................... 375/240.03
See application file for complete search history.

(56) References Cited

U.S. PATENT DOCUMENTS

| | | | |
|---|---|---|---|
| 10,452,955 | B2 | 10/2019 | Gao et al. |
| 2011/0228843 | A1 | 9/2011 | Narroschke et al. |
| 2013/0195178 | A1 | 8/2013 | Price et al. |
| 2018/0343449 | A1* | 11/2018 | Amer ........................ G06T 5/20 |
| 2019/0098302 | A1 | 3/2019 | Alakuijala et al. |
| 2022/0109857 | A1 | 4/2022 | Tourapis et al. |
| 2025/0071272 | A1* | 2/2025 | Gao ....................... H04N 19/85 |
| 2025/0097475 | A1* | 3/2025 | Gao ..................... H04N 19/176 |

FOREIGN PATENT DOCUMENTS

| | | |
|---|---|---|
| JP | 2015-508954 | 3/2015 |
| JP | 2020-522175 | 7/2020 |
| WO | 2010/061607 | 6/2010 |

OTHER PUBLICATIONS

Jin Young Lee et al, "[VCM] VCM description and scope" 136. MPEG Meeting; Online; (Motion Picture Expert Group or ISO/IEC JTC1/SC29/WG11,) No. m58158 https://dms.mpeg.expert/doc_end_user/documents/136_Online/wg11/m58158-v2-m58158_VCM_description_and_scope_r1.docx [retrieved from the Internet on Oct. 12, 2021] pp. 1,2 XP030298889.

Jill Boyce et al, "Supplemental enhancement information for coded video bitstreams (Draft 4)" 130. MPEG Meeting Alpbach;(Motion Picture Expert Group or ISO/IEC JTC1/SC29/WG11) http://phenix.int-evry.fr/mpeg/doc_end_user/documents/130_Alpbach/wg11/m53986-JVET-R2007-v4-JVET-R2007-v4.zip_JVET-R2007-v4.docx [retrieved from the Internet on Jun. 26, 2020] p. 23, XP030289598.

International Search Report issued Jun. 20, 2023 in corresponding International Application No. PCT/JP2023/017508.

* cited by examiner

FIG.7F

| | | | | |
|---|---|---|---|---|
| 2 | 4 | 5 | 4 | 2 |
| 4 | 9 | 12 | 9 | 4 |
| 5 | 12 | 15 | 12 | 5 |
| 4 | 9 | 12 | 9 | 4 |
| 2 | 4 | 5 | 4 | 2 |

FIG.7G

| | | | | |
|---|---|---|---|---|
| 1 | 4 | 7 | 4 | 1 |
| 4 | 16 | 26 | 16 | 4 |
| 7 | 26 | 41 | 26 | 7 |
| 4 | 16 | 26 | 16 | 4 |
| 1 | 4 | 7 | 4 | 1 |

| | | | | | | |
|---|---|---|---|---|---|---|
| 0 | 0 | 1 | 1 | 1 | 0 | 0 |
| 0 | 1 | 3 | 3 | 3 | 1 | 0 |
| 1 | 3 | 0 | -7 | 0 | 3 | 1 |
| 1 | 3 | -7 | -24 | -7 | 3 | 1 |
| 1 | 3 | 0 | -7 | 0 | 3 | 1 |
| 0 | 1 | 3 | 3 | 3 | 1 | 0 |
| 0 | 0 | 1 | 1 | 1 | 0 | 0 |

FIG.8

| MACHINE TASK | FILTER |
|---|---|
| OBJECT DETECTION | NOISE REMOVAL (WEAK) + SHARPENING (WEAK) |
| OBJECT SEGMENTATION | NOISE REMOVAL (WEAK) |
| OBJECT TRACKING | NOISE REMOVAL (STRONG) + SHARPENING (WEAK) |
| ACTION RECOGNITION | NOISE REMOVAL (STRONG) + SHARPENING (STRONG) |
| POSE ESTIMATION | SHARPENING (STRONG) |

FIG.9A

| | | |
|---|---|---|
| -1 | -1 | -1 |
| -1 | 9 | -1 |
| -1 | -1 | -1 |

FILTER STRENGTH = 9

FIG.9B

| | | |
|---|---|---|
| -1 | -2 | -1 |
| -2 | 15 | -2 |
| -1 | -2 | -1 |

FILTER STRENGTH = 5

FIG.10A

| | | |
|---|---|---|
| 0 | -1 | 0 |
| -1 | 4 | -1 |
| 0 | -1 | 0 |

FIG.10B

| | | |
|---|---|---|
| -1 | 0 | 1 |
| -2 | 0 | 2 |
| -1 | 0 | 1 |

FIG.10C

| | | |
|---|---|---|
| 1 | 2 | 1 |
| 0 | 0 | 0 |
| -1 | -2 | -1 |

FIG.13

| postfilter_hint(payloadsize){ | Descriptor |
|---|---|
| **postfilter_hint_size_y** | ue(v) |
| **postfilter_hint_size_x** | ue(v) |
| **num_of_postfilters** | u(4) |
| for ( n = 0; n < num_of_postfilters; n++ ) | |
| **postfilter_hint_type** | u(2) |
| for( cIdx = 0; cIdx < ( chroma_format_idc = = 0 ? 1 : 3 ); cIdx++ ) | |
| for( cy = 0; cy < postfilter_hint_size_y; cy++ ) | |
| for( cx = 0; cx < postfilter_hint_size_x; cx++ ) | |
| **postfilter_hint_value**[ cIdx ][ cy ][ cx ] | se(v) |
| } | |

FIG.14

| derivative_filter_hint(payloadsize){ | Descriptor |
|---|---|
| **derivative_filter_hint_size_y** | ue(v) |
| **derivative_filter_hint_size_x** | ue(v) |
| num_of_derivative_filters | u(4) |
| for ( n = 0; n < num_of_derivative_filters; n++ ) | |
| **derivative_filter_hint_type** | u(2) |
| for( cIdx = 0; cIdx < ( chroma_format_idc = = 0 ? 1 : 3 ); cIdx++ ) | |
| for( cy = 0; cy < derivative_filter_hint_size_y; cy++ ) | |
| for( cx = 0; cx < derivative_filter_hint_size_x; cx++ ) | |
| **derivative_filter_hint_value**[ cIdx ][ cy ][ cx ] | se(v) |
| } | |

IMAGE ENCODING METHOD OF ENCODING A FIRST IMAGE GENERATED IN ACCORDANCE WITH IMAGE USAGE, AND IMAGE DECODING METHOD OF GENERATING A SECOND IMAGE BY APPLYING A FILTER SELECTED BASED ON IMAGE USAGE TO THE FIRST IMAGE

FIELD OF INVENTION

The present disclosure relates to an image encoding device, an image decoding device, an image encoding method, and an image decoding method.

BACKGROUND ART

Patent Literature 1 discloses a video encoding and decoding method using an adaptive coupled prefilter and a postfilter.

Patent Literature 2 discloses an encoding method of image data for loading into an artificial intelligence (AI) integrated circuit.

Patent Literature 1: U.S. Pat. No. 9,883,207

Patent Literature 2: U.S. Pat. No. 10,452,955

SUMMARY OF THE INVENTION

An object of the present disclosure is to change a filter applied to a decoded image in accordance with an image usage.

An image decoding device according to one aspect of the present disclosure includes: circuitry; and a memory connected to the circuitry, in which, in operation, the circuitry acquires a first image and a plurality of first filter sets by decoding a bitstream, and generates and outputs a second image by selecting one first filter set from the plurality of first filter sets based on usage information indicating an image usage, and applying the first filter set having been selected to the first image.

BRIEF DESCRIPTION OF THE DRAWINGS

FIG. 7F is a view illustrating an example of the plurality of first filters of different types.

FIG. 7G is a view illustrating an example of the plurality of first filters of different types.

FIG. 8 is a view illustrating an example of a lookup table that defines selection of a first filter set based on an image usage.

FIG. 9A is a view illustrating an example of a sharpening filter having a strong filter strength.

FIG. 9B is a view illustrating an example of a sharpening filter having a weak filter strength.

FIG. 10A is a view illustrating an example of a second filter.

FIG. 10B is a view illustrating an example of the second filter.

FIG. 10C is a view illustrating an example of the second filter.

FIG. 13 is a view illustrating an example of SEI message syntax regarding first filter set information.

FIG. 14 is a view illustrating an example of SEI message syntax regarding second filter information.

DETAILED DESCRIPTION

Knowledge Underlying Present Disclosure

Figure 1:
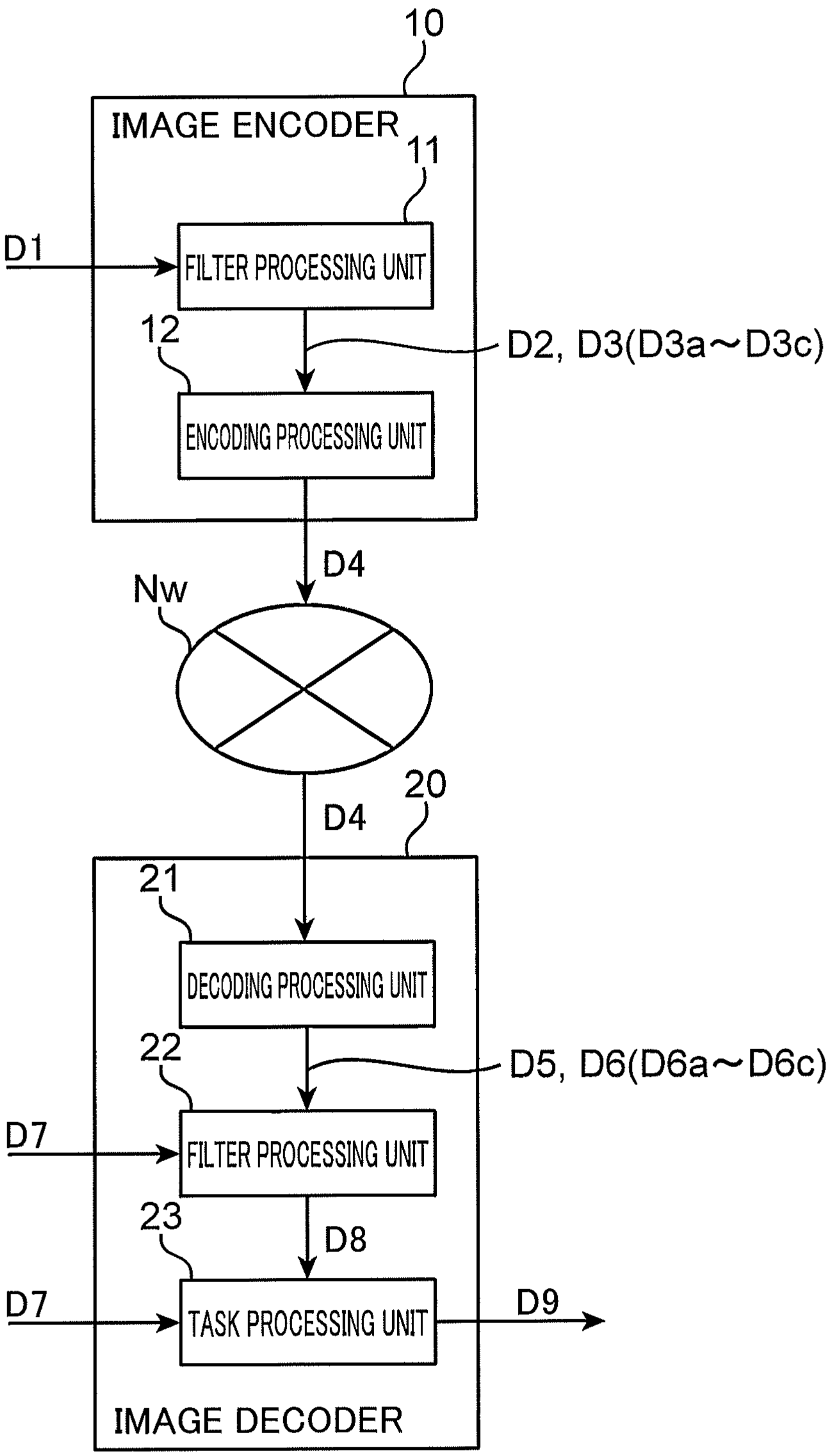
FIG. 1 is a view illustrating a simplified configuration of an image processing system according to an embodiment of the present disclosure.

The conventional encoding method has aimed to provide optimal video under bit rate constraints for human vision.

With the progress of machine learning or neural network-based applications along with abundant sensors, many intelligent platforms that handle large amounts of data, including connected cars, video surveillance, and smart cities have been implemented. Since large amounts of data are constantly generated, the conventional method involving humans in pipelines has become inefficient and unrealistic in terms of latency and scale.

Furthermore, in transmission and archive systems, there is a concern that more compact data representation and low-latency solutions are required, and therefore, video coding for machines (VCM) has been introduced.

In some cases, machines can communicate with each other and execute tasks without human intervention, while in other cases, additional processing by humans may be necessary for decompressed specific streams. Such cases include a case where for example, in surveillance cameras, a human "supervisor" searches for a specific person or scene in a video.

In other cases, corresponding bitstreams are used by both humans and machines. For connected cars, features can be used for image correction functions for humans and for object detection and segmentation for machines.

Typical system architecture includes a pair of image encoding device and image decoding device. The input of the system is a video, a still image, or a feature quantity. Examples of a machine task include object detection, object segmentation, object tracking, action recognition, pose estimation, or a discretionary combination thereof. There is a possibility that human vision is one of the use cases that can be used along with the machine task.

According to the conventional technique, there is a problem that a filter applied to a decoded image in an image decoding device cannot be dynamically changed in accordance with an image usage.

In order to solve such a problem, the present inventor has found that a decoded image and a plurality of filter sets are acquired by decoding a bitstream, and a filter set to be applied to the decoded image can be dynamically changed in accordance with an image usage by selecting one filter set from the plurality of filter sets based on usage information indicating an image usage on an image decoding device side, and have arrived at the present disclosure.

Next, each aspect of the present disclosure will be described.

An image decoding device according to a first aspect of the present disclosure includes: circuitry; and a memory connected to the circuitry, in which, in operation, the circuitry acquires a first image and a plurality of first filter sets by decoding a bitstream, and generates and outputs a second image by selecting one first filter set from the plurality of first filter sets based on usage information indicating an image usage, and applying the first filter set having been selected to the first image.

According to the first aspect, the first filter set applied to the first image can be dynamically changed in accordance with the image usage.

In the image decoding device according to a second aspect of the present disclosure, in the first aspect, the circuitry may acquire a plurality of second filters and a plurality of parameter values by decoding the bitstream, may select one first filter set from the plurality of first filter sets, may select one second filter from the plurality of second filters, and may select one parameter value from the plurality of parameter values based on the usage information, and may select one first filter from the first filter set based on a feature value obtained by applying the second filter having been selected to the first image and the parameter value having been selected, and may generate the second image by applying the first filter having been selected to the first image.

According to the second aspect, the first filter applied to the first image can be dynamically changed based on the feature value of the first image obtained by application of the second filter.

In the image decoding device according to a third aspect of the present disclosure, in the second aspect, the number of pixels in a first image region of the first image, the first image region applied with the first filter, may be is equal to the number of pixels of a second image region of the first image, the second image region applied with the second filter, and a range of the second image region may be wider than a range of the first image region.

According to the third aspect, it is possible to reduce the influence of local noise while suppressing an increase in the processing load due to application of the second filter.

In the image decoding device according to a fourth aspect of the present disclosure, in any one of the first to third aspects, one of the plurality of first filter sets may be a bypass filter that outputs the first image as the second image.

According to the fourth aspect, by selecting the bypass filter, it is possible to avoid unnecessary filter processing from being executed.

In the image decoding device according to a fifth aspect of the present disclosure, in any one of the first to fourth aspects, the circuitry may acquire, as one of the plurality of first filter sets, a postfilter set corresponding to a prefilter set applied to an input image by an image encoding device by decoding the bitstream received from the image encoding device.

According to the fifth aspect, since the conversion processing from the prefilter set to the postfilter set is executed on the image encoding device side, the processing load of the image decoding device can be reduced.

In the image decoding device according to a sixth aspect of the present disclosure, in any one of the first to fourth aspects, the circuitry may acquire a prefilter set applied to an input image by an image encoding device by decoding the bitstream received from the image encoding device, and acquire, as one of the plurality of first filter sets, a postfilter set corresponding to the prefilter set by converting the prefilter set.

According to the sixth aspect, since the conversion processing from the prefilter set to the postfilter set is executed on the image decoding device side, the processing load of the image encoding device can be reduced.

In the image decoding device according to a seventh aspect of the present disclosure, in any one of the first to sixth aspects, the image usage may include at least one machine task and human vision.

According to the seventh aspect, it is possible to not only select the first filter set suitable for the machine task but also select the first filter set suitable for human vision.

In the image decoding device according to an eighth aspect of the present disclosure, in any one of the first to seventh aspects, the circuitry may acquire the plurality of first filter sets by decoding a header of the bitstream.

According to the eighth aspect, by storing the first filter set in the header of a bitstream, the circuitry can easily acquire the first filter.

In the image decoding device according to a ninth aspect of the present disclosure, in the eighth aspect, the header may have a supplemental enhancement information (SEI) region, and the circuitry may acquire the plurality of first filter sets by decoding the SEI region.

According to the ninth aspect, by storing the first filter set in the SEI region, the first filter set can be easily handled as additional information.

An image encoding device according to a tenth aspect of the present disclosure includes: circuitry; and a memory connected to the circuitry, in which, in operation, the circuitry generates a first image by applying a prefilter set in accordance with an image usage to an input image, and generates a bitstream by encoding the first image and the prefilter set or a postfilter set corresponding to the prefilter set.

According to the tenth aspect, since the bitstream includes the first image and the plurality of prefilter sets or the plurality of postfilter sets, the image decoding device can perform the optimum postfilter processing in accordance with the prefilter processing applied to the first image.

In the image encoding device according to an eleventh aspect of the present disclosure, in the tenth aspect, the image usage may be an image usage in an image decoding device, and the circuitry may transmit the bitstream to the image decoding device.

According to the eleventh aspect, a prefilter set in accordance with the image usage in the image decoding device can be applied to the input image.

An image decoding method according to a twelfth aspect of the present disclosure includes: acquiring a first image and a plurality of first filter sets by decoding a bitstream, and generating and outputting a second image by selecting one first filter set from the plurality of first filter sets based on usage information indicating an image usage, and applying the first filter set having been selected to the first image.

According to the twelfth aspect, the first filter set to be applied to the first image can be dynamically changed in accordance with the image usage.

An image encoding method according to a thirteenth aspect of the present disclosure includes: generating a first image by applying a prefilter set in accordance with an image usage to an input image; and generating a bitstream by encoding the first image and the prefilter set or a postfilter set corresponding to the prefilter set.

According to the thirteenth aspect, since the bitstream includes the first image and the prefilter set or the postfilter set, the image decoding device can perform the optimum postfilter processing in accordance with the prefilter processing applied to the first image.

Embodiments of Present Disclosure

Embodiments of the present disclosure will be described below in detail with reference to the drawings. Elements denoted by the same corresponding reference signs in different drawings represent the same or corresponding elements.

Embodiments to be described below will each refer to a specific example of the present disclosure. The numerical values, shapes, constituent elements, steps, orders of the steps, and the like of the following embodiments are merely examples, and do not intend to limit the present disclosure. A constituent element not described in an independent claim representing the highest concept among constituent elements in the embodiments below is described as a discretionary constituent element. In all embodiments, respective items of content can be combined.

FIG. 1 is a view illustrating a simplified configuration of an image processing system according to an embodiment of the present disclosure. The image processing system includes an image encoding device 10, a network Nw, and an image decoding device 20.

The image encoding device 10 includes a filter processing unit 11 and an encoding processing unit 12. Image data D1 of an input image is input to the filter processing unit 11. The input image includes a video, still image, or feature quantity. The filter processing unit 11 includes a plurality of prefilter sets of different types in accordance with the image usage on the image decoding device 20 side. The filter processing unit 11 selects one prefilter set from the plurality of prefilter sets in accordance with the image usage, generates a first image by performing filter processing using the selected prefilter set on the input image, and outputs image data D2 of the first image. The filter processing unit 11 outputs filter information D3 regarding the filter applied to the input image. The filter information D3 includes a plurality of pieces of first filter set information D3*a* regarding the prefilter set (or the postfilter set complementary thereto) applied to the input image and another prefilter set or postfilter set, a plurality of pieces of second filter information D3*b* regarding a plurality of feature extraction filters, and a plurality of pieces of parameter value information D3*c*. The filter processing unit 11 selects a prefilter to be applied to the input image based on a result of comparison between a feature value obtained by applying a feature extraction filter to the input image and a parameter value such as a threshold.

The encoding processing unit 12 generates a bitstream D4 by performing encoding processing on the image data D2 and the filter information D3, and transmits the bitstream D4 to the image decoding device 20 via the network Nw.

The network Nw is the Internet, a wide area network (WAN), a local area network (LAN), or a discretionary combination thereof. The network Nw needs not necessarily be limited to a bidirectional communication network, but may be a unidirectional communication network that transmits broadcast waves such as terrestrial digital broadcasting or satellite broadcasting. The network Nw may be a recording medium such as a digital versatile disc (DVD) or a Blue-ray disc (BD) on which the bitstream D4 is recorded.

The image decoding device 20 includes a decoding processing unit 21, a filter processing unit 22, and a task processing unit 23. The decoding processing unit 21 receives the bitstream D4 from the image encoding device 10 via the network Nw, generates a first image by decoding the bitstream D4, and outputs the image data D5 of the first image corresponding to the image data D2. The decoding processing unit 21 acquires filter information D6 corresponding to the filter information D3 by decoding the bitstream D4. The filter information D6 includes a plurality of pieces of first filter set information D6*a* corresponding to the plurality of pieces of first filter set information D3*a*, a plurality of pieces of second filter information D6*b* corresponding to the plurality of pieces of second filter information D3*b*, and a plurality of pieces of parameter value information D6*c* corresponding to the plurality of pieces of parameter value information D3*c*.

Based on usage information D7 indicating the image usage in task processing unit 23, the filter processing unit 22 selects one first filter set from a plurality of first filter sets indicated by the first filter set information D6*a*, one second filter from a plurality of second filters indicated by the second filter information D6*b*, and one parameter value from a plurality of parameter values indicated by the parameter value information D3*c*. The image usage may be designated by a user, for example, or may be acquired by decoding the bitstream D4 as one piece of the filter information D6. The filter processing unit 22 selects one first filter from the first filter set based on a result of comparison between a feature value obtained by applying the selected second filter to the first image and the selected parameter value. The filter processing unit 22 generates the second image by applying the selected first filter to the first image, and outputs image data D8 of the second image.

One of the plurality of first filter sets may be a bypass filter that bypasses the filter processing and causes the filter processing unit 22 to output the first image (image data D5) as the second image (image data D8). By selecting the bypass filter, it is possible to avoid unnecessary filter processing from being executed. For example, the bypass filter may be indicated by setting the values of all filter coefficients to a specific value (e.g., 0), or the bypass filter may be indicated by another information in place of the setting of the values of the filter coefficients. When the first filter set corresponding to the image usage indicated by the usage information D7 does not exist in the plurality of first filter sets indicated by the first filter set information D6*a*, the filter processing unit 22 may be caused to output the first image (image data D5) by bypassing the filter processing.

By using the second image indicated by the image data D8, the task processing unit 23 executes task processing in accordance with the usage information D7 indicating the image usage, and outputs result data D9 such as an inference result.

Figure 2:
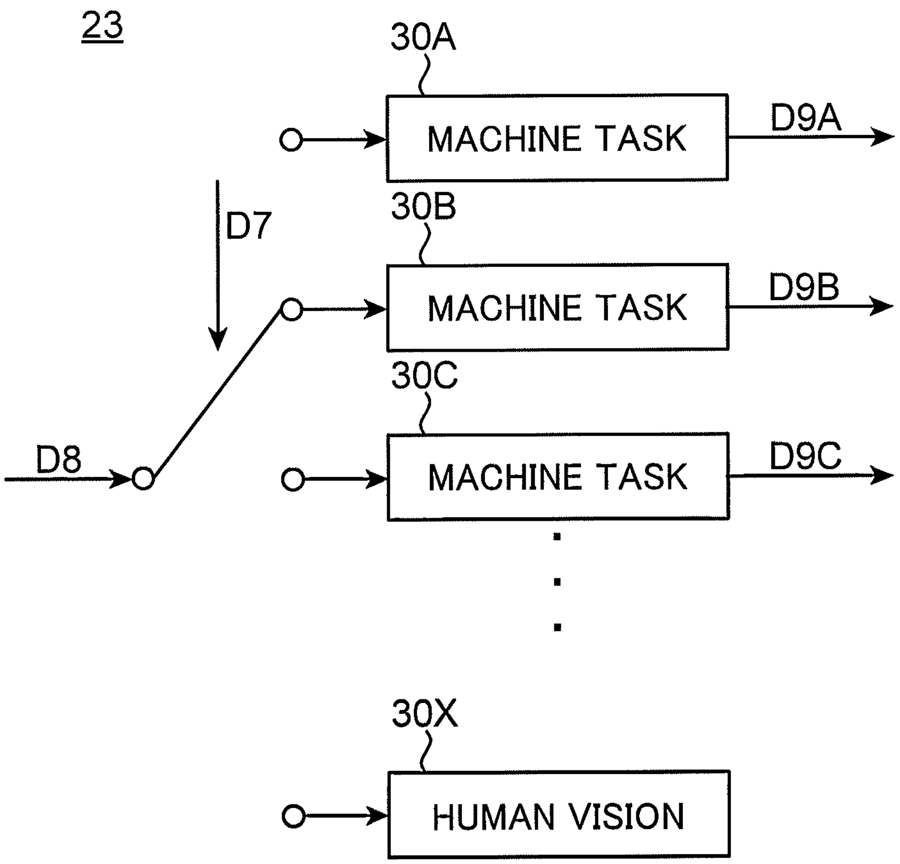
FIG. 2 is a view illustrating a simplified configuration of a task processing unit.

FIG. 2 is a view illustrating a simplified configuration of the task processing unit 23. The image usage on the image decoding device 20 side includes at least one machine task and human vision. In the example of FIG. 2, the image usage includes a plurality of machine tasks 30A to 30C and human vision 30X. When the usage information D7 selects, for example, the machine task 30B, the task processing unit 23 executes the machine task 30B based on the image data D8 and outputs result data D9B such as an inference result. By including human vision in the image usage, the filter processing unit 22 can not only select the first filter set suitable for the machine task but also select the first filter set suitable for the human vision.

Figure 3A:
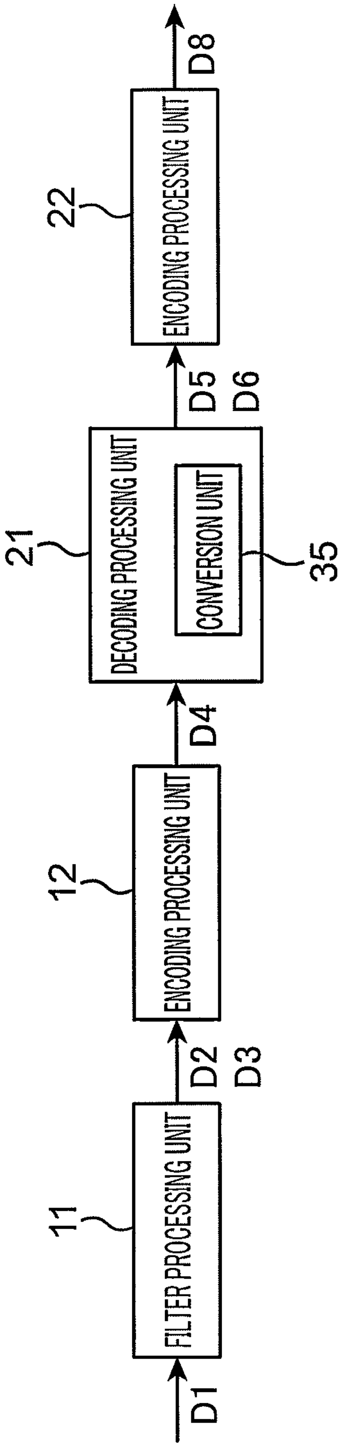
FIG. 3A is a view illustrating an example of a partial configuration of the image processing system.

FIG. 3A is a view illustrating an example of a partial configuration of an image processing system. The decoding processing unit 21 of the image decoding device 20 includes a conversion unit 35. The conversion unit 35 converts a prefilter set into a postfilter set complementary thereto. In a case of this example, the bitstream D4 includes a prefilter set as one of the first filter set information D3*a*. The decoding processing unit 21 acquires a prefilter set applied to the input image by the image encoding device 10 by decoding the bitstream D4, and acquires, as one of the plurality of first filter sets, a postfilter set corresponding to the prefilter set by converting the prefilter set by the conversion unit 35. According to such a configuration, since the conversion processing from the prefilter set to the postfilter set is executed on the image decoding device 20 side, the processing load of the image encoding device 10 can be reduced.

Figure 3B:
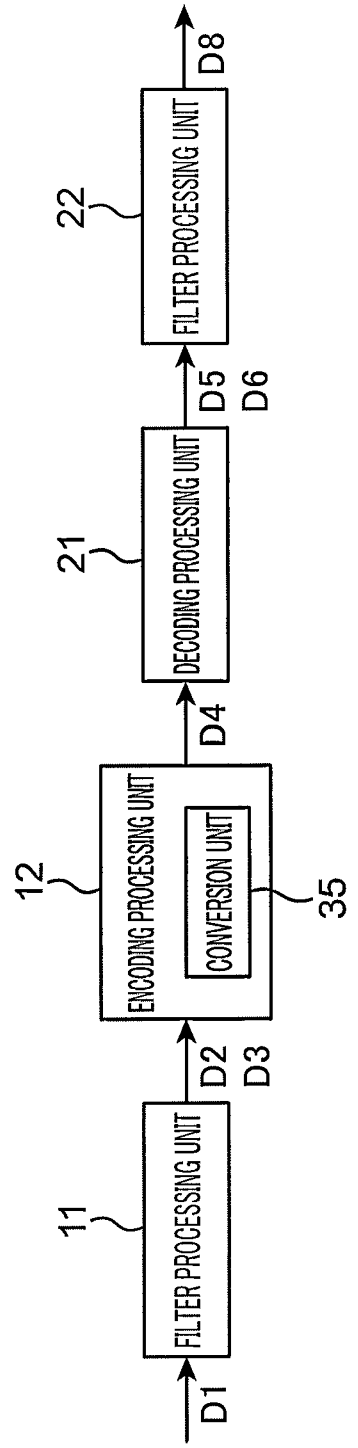
FIG. 3B is a view illustrating an example of a partial configuration of the image processing system.

FIG. 3B is a view illustrating an example of a partial configuration of the image processing system. The encoding processing unit 12 of the image encoding device 10 includes the conversion unit 35. The conversion unit 35 converts a prefilter set into a postfilter set complementary thereto. In a case of this example, the bitstream D4 includes a postfilter set as one of the first filter set information D3*a*. The decoding processing unit 21 acquires, as one of the plurality of first filter sets, a postfilter set corresponding to the prefilter set applied to the input image by the image encoding device 10 by decoding the bitstream D4. According to such a configuration, since the conversion processing from the prefilter set to the postfilter set is executed on the image encoding device 10 side, the processing load of the image decoding device 20 can be reduced. The filter processing unit 11 may include, in one of the plurality of pieces of first filter set information D3*a*, a postfilter set generated in accordance with the image usage on the image decoding device 20 side, regardless of the prefilter set applied to the input image. The encoding processing unit 12 may include, in the bitstream D4 as one of the plurality of pieces of first filter set information D3*a*, the postfilter set generated in accordance with the image usage on the image decoding device 20 side without including the conversion unit 35.

Figure 4A:
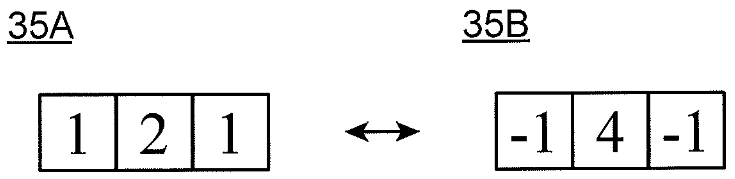
FIG. 4A is a view illustrating an example of filter conversion processing by a conversion unit.

FIG. 4A is a view illustrating an example of filter conversion processing by the conversion unit 35. The conversion unit 35 converts a prefilter using a noise removal filter 35A having a filter strength of ½ into a postfilter using a sharpening filter 35B having a filter strength of 2. Alternatively, the conversion unit 35 converts a prefilter using the sharpening filter 35B having a filter strength of 2 into a postfilter using the noise removal filter 35A having a filter strength of ½.

Figure 4B:
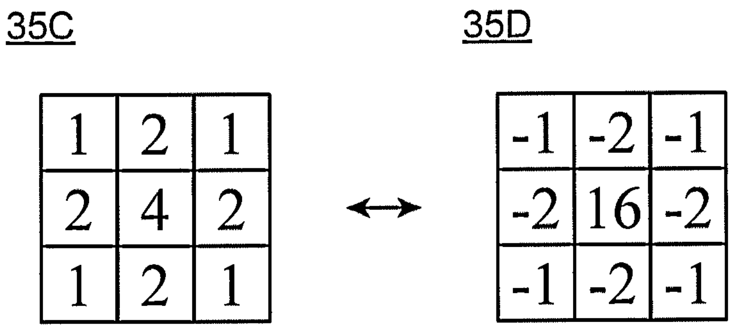
FIG. 4B is a view illustrating an example of the filter conversion processing by the conversion unit.

FIG. 4B is a view illustrating an example of filter conversion processing by the conversion unit 35. The conversion unit 35 converts a prefilter using a noise removal filter 35C having a filter strength of ¼ into a postfilter using a sharpening filter 35D having a filter strength of 4. Alternatively, the conversion unit 35 converts a prefilter using the sharpening filter 35D having a filter strength of 4 into a postfilter using the noise removal filter 35C having a filter strength of ¼.

Figure 5:
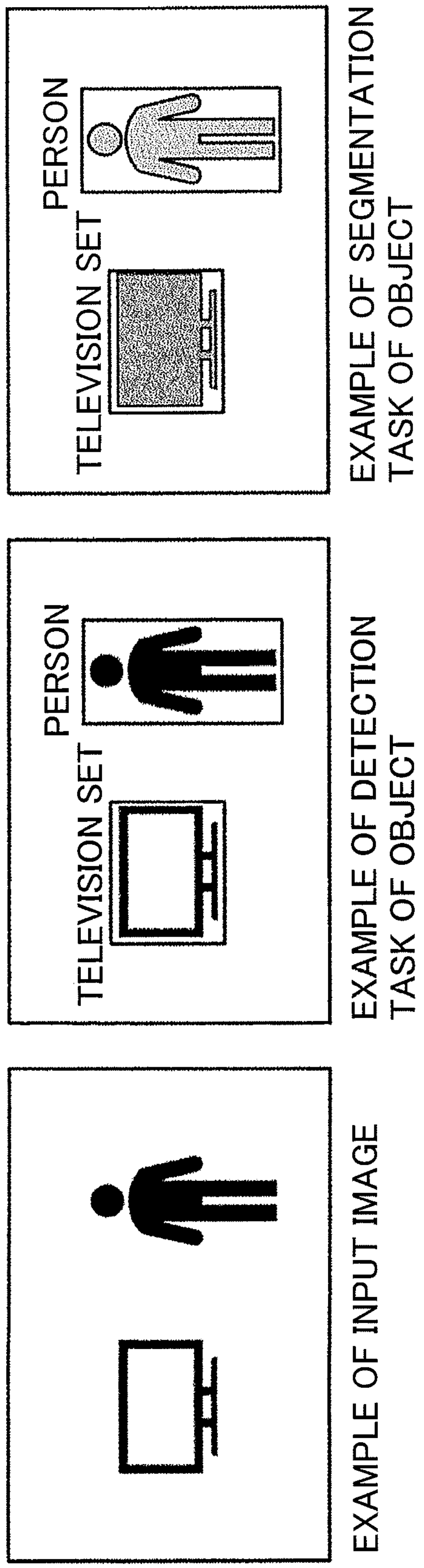
FIG. 5 is a view illustrating object detection and object segmentation as an example of a machine task.

FIG. 5 is a view illustrating object detection and object segmentation as an example of a machine task. In object detection, an attribute of an object (television set and person in this example) included in an input image is detected. In addition to the attribute of the object included in the input image, the position and the number of objects in the input image may be detected. By the object detection, for example, the position of the object of a recognition target may be narrowed down, or objects other than the object of the recognition target may be excluded. As a specific use, for example, detection of a face in a camera and detection of a pedestrian or the like in autonomous driving can be considered. In object segmentation, pixels in a region corresponding to the object are segmented (i.e., partitioned). By the object segmentation, for example, usage such as separating obstacles and roads in autonomous driving to provide assistance to safe traveling of an automobile, detecting product defects in a factory, and identifying terrain in a satellite image can be considered.

Figure 6:
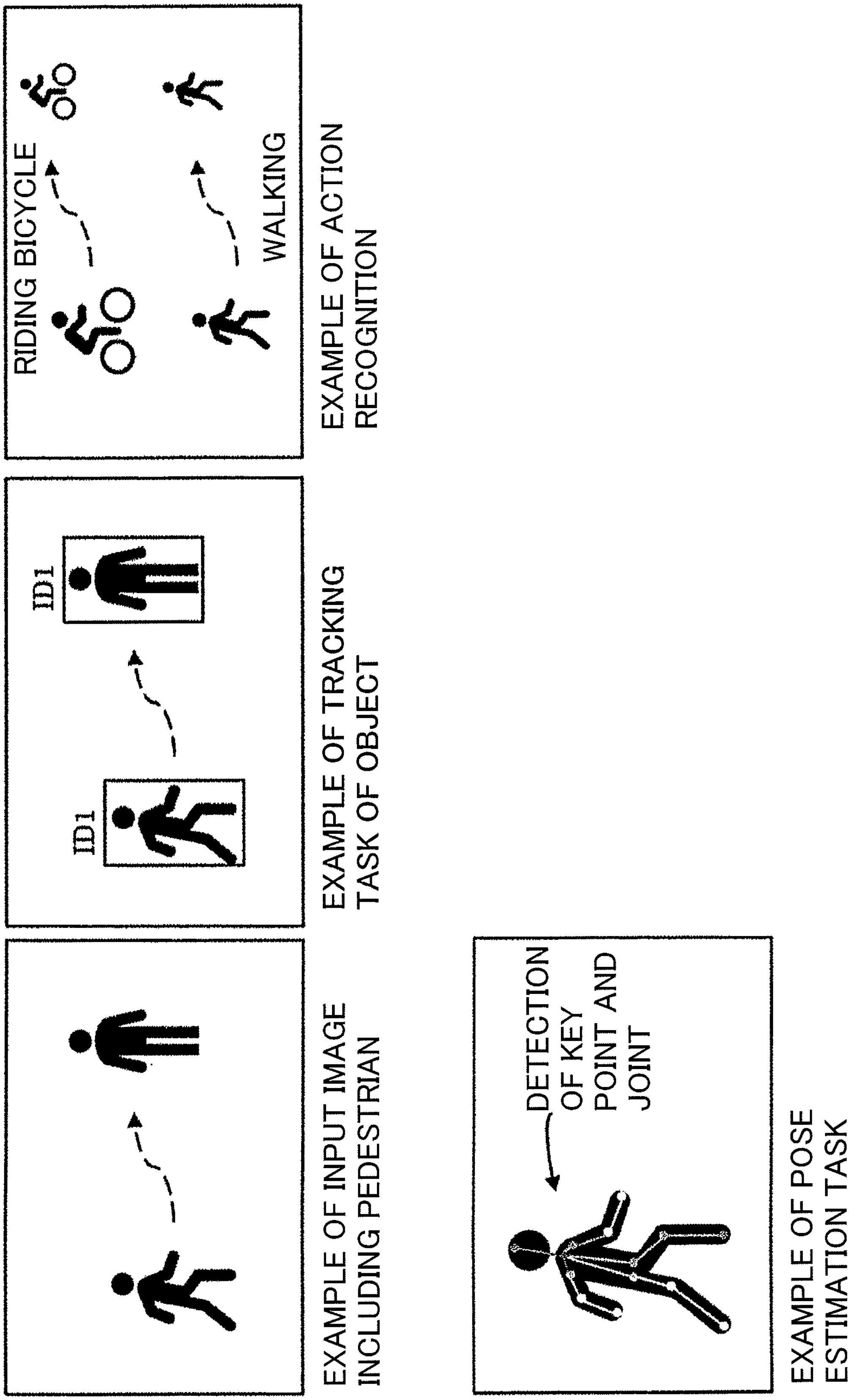
FIG. 6 is a view illustrating object tracking, action recognition, and pose estimation as an example of a machine task.

FIG. 6 is a view illustrating object tracking, action recognition, and pose estimation as an example of a machine task. In object tracking, the movement of an object assigned with an identification number ID is tracked. As a use, for example, counting the number of users in a shop or other facilities and analyzing motion of an athlete can be considered. Faster processing will enable real-time object tracking and application to camera processing such as autofocus. In action recognition, the type of action of the object (in this example, "riding a bicycle" and "walking") is detected. For example, by the use for a security camera, application to prevention and detection of criminal behavior such as robbery and shoplifting, and prevention of forgetting work in a factory is possible. In pose estimation, the posture of the object is detected by detection of a key point and a joint. For example, utilization in an industrial field such as improvement of work efficiency in a factory, a security field such as detection of abnormal behavior, and healthcare and sports fields can be considered.

The filter processing unit 11 includes a plurality of first filter sets of different types in accordance with the image usage on the image decoding device 20 side. The type includes at least one of the shape, size, and coefficient value of the filter. The first filter set corresponding to the machine task includes at least one of a noise removal filter, a sharpening filter, a bit depth conversion filter, a color space conversion filter, a resolution conversion filter, and a filter using a neural network. The noise removal filter includes at least one of a low-pass filter, a Gaussian filter, a smoothing filter, an averaging filter, a bilateral filter, and a median filter to remove noise by reducing information on details of the input image. The sharpening filter includes an edge detection filter or an edge enhancement filter, specifically includes a Laplacian filter, a Gaussian-Laplacian filter, a Sobel filter, a Prewitt filter, or a Canny edge detection filter. The bit depth conversion filter converts bit depth of a luminance signal and/or a color signal between the input image and the first image. For example, by truncating lower bits of the color signal of the first image and converting the bit depth of the first image to be smaller than the bit depth of the input image, a code amount is reduced. The color space conversion filter converts the color space between the input image and the first image. For example, by converting a color space of YUV444 in the input image to YUV422, YUV420, or YUV400 in the first image, the code amount is reduced. The resolution conversion filter converts the image resolution between the input image and the first image. The resolution conversion filter includes a downsampling filter that reduces the resolution of the first image as compared with the resolution of the input image. The resolution conversion filter may include an upsampling filter that increases the resolution of the first image as compared with the resolution of the input image. The first filter set corresponding to the machine task may be, for example, a deblocking filter, an ALF filter, a CCALF filter, an SAO filter, an LMCS filter, which are defined in H.266/Versatile Video Codec (VVC), or a discretionary combination thereof.

The first filter set corresponding to human vision is a filter that does not reduce the code amount of the first image as compared with the code amount of the input image by the filter processing. The first filter set corresponding to human vision includes a bypass filter that outputs an input image as it is as a first image. The first filter set corresponding to human vision may be a filter that reduces the code amount of the first image as compared with the code amount of the input image by filter processing, but the reduction effect of the code amount is suppressed more than that of the first filter set corresponding to the machine task. The first filter set corresponding to human vision may be a filter that enhances an important region of the input image, but the enhancement effect is suppressed more than that of the first filter set corresponding to the machine task.

Figure 7A:
FIG. 7A is a view illustrating an example of a plurality of first filters of different types.
Figure 7B:
FIG. 7B is a view illustrating an example of the plurality of first filters of different types.
Figure 7C:
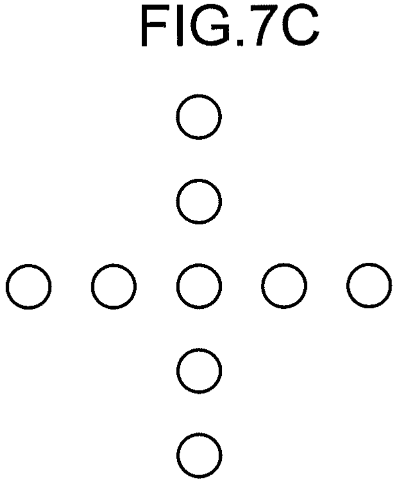
FIG. 7C is a view illustrating an example of the plurality of first filters of different types.
Figure 7D:
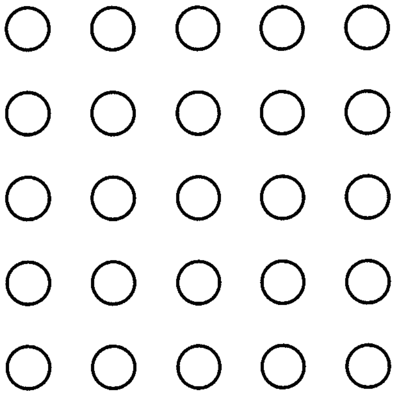
FIG. 7D is a view illustrating an example of the plurality of first filters of different types.
Figure 7E:
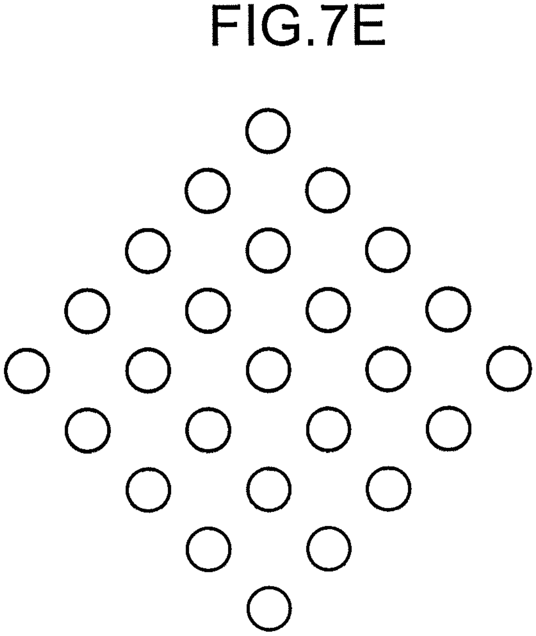
FIG. 7E is a view illustrating an example of the plurality of first filters of different types.
Figures 7H, 7I:
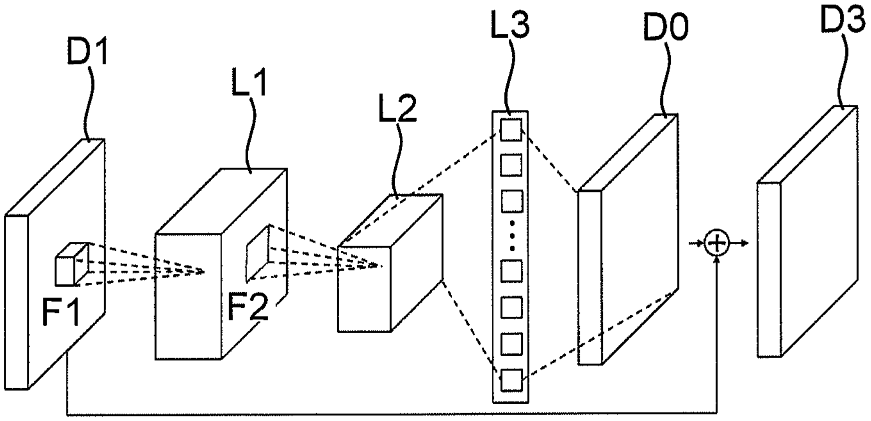
FIG. 7H is a view illustrating an example of the plurality of first filters of different types.
FIG. 7I is a view illustrating an example of the plurality of first filters of different types.

FIGS. 7A to 7I are views illustrating examples of a plurality of first filters of different types. FIG. 7A illustrates a one-dimensional horizontal filter with N=5. N is the size of the filter corresponding to the number of filter coefficient values. FIG. 7B illustrates a one-dimensional vertical filter with N=7. FIG. 7C illustrates a two-dimensional cross-shaped filter with N=9. FIG. 7D illustrates a two-dimensional square filter with N=25. FIG. 7E illustrates a two-dimensional rhombic filter with N=25. FIGS. 7F and 7G illustrate a noise removal filter using a 5×5 Gaussian filter. The filter of FIG. 7F has a relatively strong filter strength, and the filter of FIG. 7G has a relatively weak filter strength. FIG. 7H illustrates an edge detection filter using a 7×7 Gaussian-Laplacian filter. As described above, the plurality of first filters of different types may have different filter shapes, different filter sizes, or different filter coefficient values. FIG. 7I illustrates the first filter using a neural network. The neural network has a convolution layer L1, a pooling layer L2, and a fully coupled layer L3. The image data of the convolution layer L1 is generated by applying a convolution filter F1 to the image data D1 of the input image, and the image data of the pooling layer L2 is generated by applying a pooling filter F2 to the image data of the convolution layer L1. Image data D0 of a predicted residual error is output from the fully coupled layer L3, and the image data D1 and the image data D0 are added to output the image data D3 of the first image.

FIG. 8 is a view illustrating an example of a lookup table that defines selection of the first filter set based on the image usage. The lookup table is held by the filter processing unit 11. When the image usage is a machine task of object detection, detailed information of the object is important, and therefore the filter processing unit 11 selects a weak noise removal filter and a weak sharpening filter. When the image usage is a machine task of object segmentation, details of the image are important in an object segmentation model (Mask R-CNN) that performs pixel-level prediction, and therefore, the filter processing unit 11 selects a weak noise removal filter. When the image usage is a machine task of object tracking, detailed information of the object is not important, and therefore, the filter processing unit 11 selects a strong noise removal filter and a weak sharpening filter. When the image usage is a machine task of action recognition, the filter processing unit 11 selects a strong noise removal filter and a strong sharpening filter in order to enhance dynamic content such as an edge of the object while removing redundant information of static content such as a background. When the image usage is a machine task of pose estimation, a pose estimation model (HRNet) learns a high-resolution image in order to detect key points of a human such as an ear or an eye, and therefore the filter processing unit 11 enhances details of the image by selecting a strong sharpening filter.

As described above, the filter processing unit 22 selects one first filter set from the plurality of first filter sets indicated by the first filter set information D6*a* based on the usage information D7 indicating the image usage in the task processing unit 23. The first filter set may be two or more filters having different filter strengths. FIG. 9A is a view illustrating an example of a sharpening filter having a strong filter strength, and the filter strength is 9. FIG. 9B is a view illustrating an example of a sharpening filter having a weak filter strength, and the filter strength is 5. The first filter set may include only one filter.

As described above, the filter processing unit 22 selects one second filter from the plurality of second filters indicated by the second filter information D6*b* based on the usage information D7 indicating the image usage in the task processing unit 23. The second filter is a feature extraction filter for classifying a region in the image based on image characteristics. As the second filter, any filter that can classify a region in the image, such as a differential filter, a saliency filter, or a segmentation filter, can be used.

The differential filter is used to calculate an image gradient such as a direction change in luminance or color in an image. As the differential filter, for example, an edge detector can be used. The edge detector may be a first-order differential filter such as a Sobel filter or a Prewitt filter, or may be a second-order differential filter such as a Laplacian filter or a Gaussian-Laplacian filter. FIGS. 10A to 10C are diagrams illustrating examples of the second filter. FIG. 10A illustrates an example of an edge detector using a Laplacian filter. FIG. 10B illustrates an example of a horizontal edge detector using a Sobel filter. FIG. 10C illustrates an example of a vertical edge detector using a Sobel filter.

The saliency filter is used to detect a visual saliency region in an image where human eyes are more focused. The visual saliency region can be used to improve a human visual recognition score or to reduce computational complexity in a machine task.

As the segmentation filter, a luminance-based image segmentation filter, a model-based image segmentation filter, or a hybrid segmentation filter can be used. The luminance-based image segmentation filter divides a region of an image based on a luminance value of each pixel in the image. The model-based image segmentation filter segments each region of an image using a neural network model such as a light-weight object detection model.

As the hybrid segmentation filter, for example, a filter in which an existing filter and a model-based image segmentation filter are combined can be used.

Figure 11A:
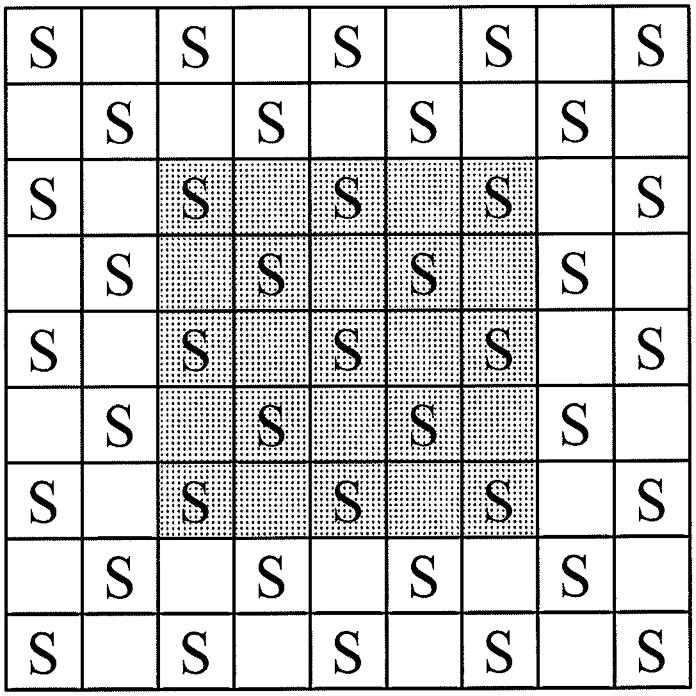
FIG. 11A is a view illustrating an example of an application region of the first filter and the second filter.
Figure 11B:
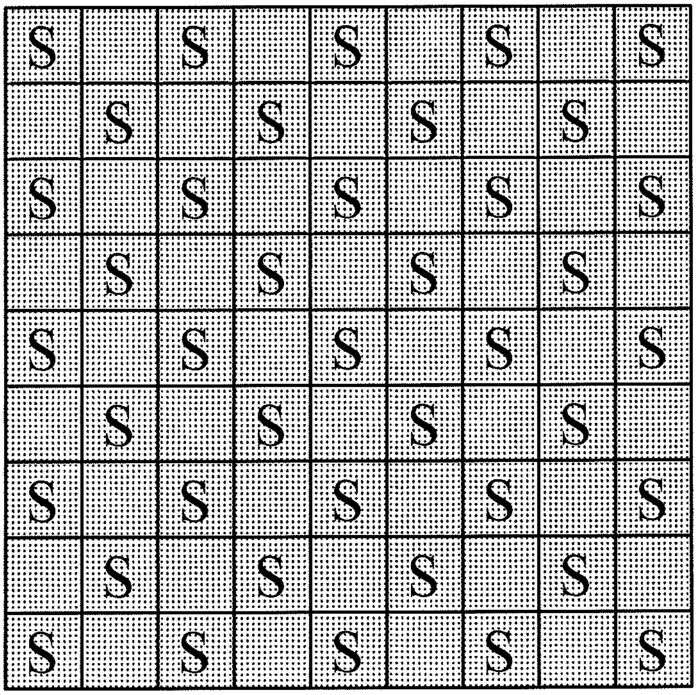
FIG. 11B is a view illustrating an example of the application region of the first filter and the second filter.
Figure 11C:
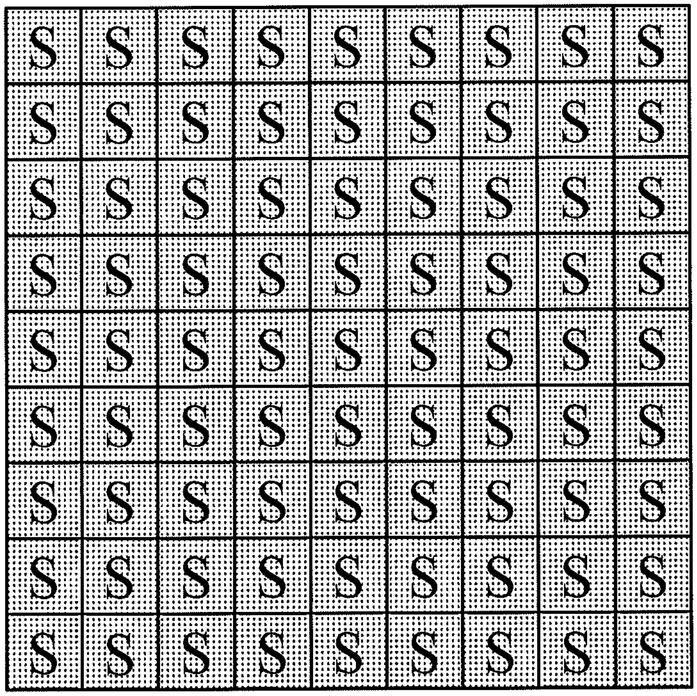
FIG. 11C is a view illustrating an example of the application region of the first filter and the second filter.

FIGS. 11A to 11C are diagrams illustrating examples of application regions of the first filter and the second filter. The rectangles indicate respective pixels in the first image. Hatched rectangles indicate pixels applied with the first filter, and rectangles with a letter "S" indicate pixels applied with the second filter.

In the example illustrated in FIG. 11A, the number of pixels of a region (first image region) of the first image, the region applied with the first filter, is equal to the number of pixels of a region (second image region) of the first image, the region applied with the second filter, and the range of the second image region is wider than the range of the first image region. According to this example, it is possible to reduce an influence of local noise while suppressing an increase in the processing load due to application of the second filter.

In the example illustrated in FIG. 11B, the number of pixels of the first image region is larger than the number of pixels of the second image region, and the range of the second image region is equal to the range of the first image region.

In the example illustrated in FIG. 11C, the number of pixels of the first image region is equal to the number of pixels of the second image region, and the range of the second image region is equal to the range of the first image region.

As described above, the filter processing unit 22 selects one first filter from the first filter set based on a result of comparison between a feature value obtained by applying the selected second filter to the first image and the selected parameter value. The feature value is, for example, an edge strength, and the parameter value is, for example, a threshold. The filter processing unit 22 applies the first filter having a weak filter strength to a first image region corresponding to a certain second image region when the edge strength regarding the second image region is equal to or greater than the threshold, and applies the first filter having a strong filter strength to a first image region corresponding to a certain second image region when the edge strength regarding the second image region is less than the threshold. A configuration of selecting one first filter from three or more first filters by setting two or more thresholds may be adopted. The filter processing unit 22 may select one first filter from two or more first filters based on a task type parameter indicated by the usage information D7. The first filter set may include only one first filter, and in this case, the same first filter may be applied in all regions in a screen without using the second filter.

Figure 12A:
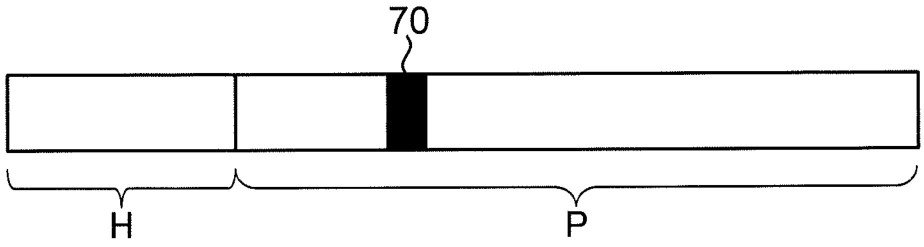
FIG. 12A is a view illustrating a first example of a data structure of a bitstream.

FIG. 12A is a view illustrating a first example of the data structure of the bitstream D4. The bitstream D4 includes a header H in which management information and the like are stored and a payload P in which the image data D2 is stored. The encoding processing unit 12 stores encoded data 70 of the filter information D3 into a predetermined location of the payload P.

Figure 12B:
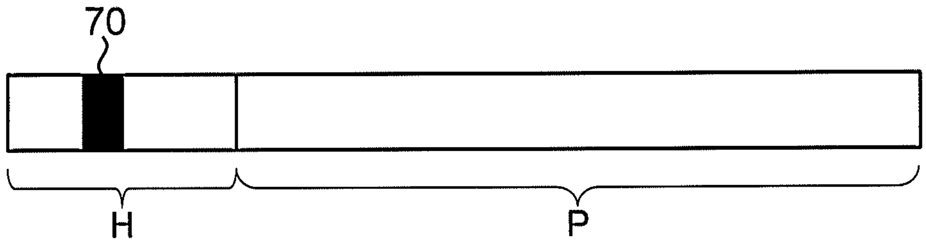
FIG. 12B is a view illustrating a second example of the data structure of the bitstream.

FIG. 12B is a view illustrating a second example of the data structure of the bitstream D4. Similarly to FIG. 12A, the bitstream D4 includes the header H and the payload P. The encoding processing unit 12 stores the encoded data 70 of the filter information D3 into a predetermined location of the header H. The predetermined location is, for example, a supplemental enhancement information (SEI) region for storing additional information. The predetermined location may be VPS, SPS, PPS, PH, SH, APS, a tile header, or the like. By storing the filter information D3 in the header H of the bitstream D4, the decoding processing unit 21 can easily acquire the filter information D6. By storing the filter information D3 in the SEI region, the filter information D3 can be easily handled as additional information.

FIG. 13 is a view illustrating an example of SEI message syntax regarding the first filter set information D3*a* indicating the postfilter. The SEI message defines a filter coefficient of the postfilter or correlation information for designing the postfilter.

postfilter_hint_size_y designates a filter coefficient or a vertical size of a correlation array, and has a value from "1" to "15", for example.

postfilter_hint_size_x designates a filter coefficient or a horizontal size of a correlation array, and has a value from "1" to "15", for example.

num_of_postfilters designates the total number of postfilters, and has a value from "1" to "15", for example.

postfilter_hint_type designates a type of a postfilter by, for example, two-bit flag information, and indicates, for example, a two-dimensional FIR filter when the value is "0", a one-dimensional FIR filter when the value is "1", and a cross-correlation matrix between an input image signal and a filtering image signal when the value is "2".

cIdx designates a relevant color component. chroma_format_idc designates a chroma format, and indicates monochrome when the value is "0", YUV420 when the value is "1", and YUV422 when the value is "2", for example. cy represents a vertical counter, and cx represents a horizontal counter. postfilter_hint_value [cIdx][cy][cx] indicates a filter coefficient or an element of a cross-correlation matrix.

FIG. 14 is a view illustrating an example of SEI message syntax regarding the second filter information D3*b* indicating the second filter. The SEI message defines a filter coefficient of the second filter or correlation information for designing the second filter.

derivative_filter_hint_size_y designates a filter coefficient or a vertical size of a correlation array, and has a value from "1" to "15", for example.

derivative_filter_hint_size_x designates a filter coefficient or a horizontal size of a correlation array, and has a value from "1" to "15", for example.

num_of_derivative_filters designates the total number of the second filters, and has a value from "1" to "15", for example.

derivative_filter_hint_type designates a type of the second filter by, for example, two-bit flag information, and indicates, for example, the two-dimensional FIR filter when the value is "0", the one-dimensional FIR filter when the value is "1", and the cross-correlation matrix between an input image signal and a filtering image signal when the value is "2".

cIdx designates a relevant color component. chroma_format_idc designates a chroma format, and indicates monochrome when the value is "0", YUV420 when the value is "1", and YUV422 when the value is "2", for example. cy represents a vertical counter, and cx represents a horizontal counter. derivative_filter_hint_value [cIdx][cy][cx] indicates a filter coefficient or an element of a cross-correlation matrix.

Figure 15:
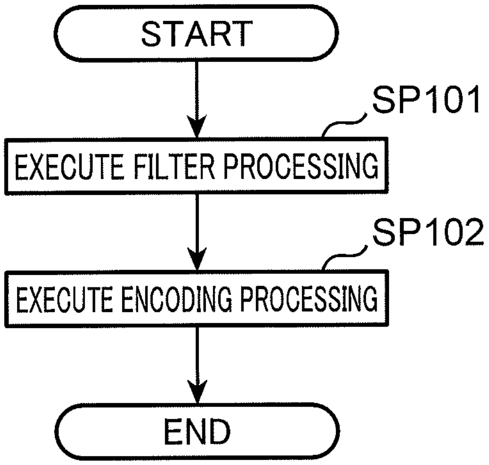
FIG. 15 is a flowchart showing a flow of processing executed by an image encoding device.

FIG. 15 is a flowchart showing the flow of processing executed by the image encoding device 10.

First, in step SP101, the filter processing unit 11 generates the first image by performing filter processing using a prefilter set on an input image, and outputs image data D2 of the first image. The filter processing unit 11 outputs filter information D3 regarding the filter applied to the input image.

Next, in step SP102, the encoding processing unit 12 generates the bitstream D4 by performing encoding processing to the first image. At that time, the encoding processing unit 12 encodes the filter information D3 and stores the encoded data 70 of the filter information D3 into the bitstream D4. The encoding processing unit 12 transmits the generated bitstream D4 to the image decoding device 20 via the network Nw.

Figure 17:
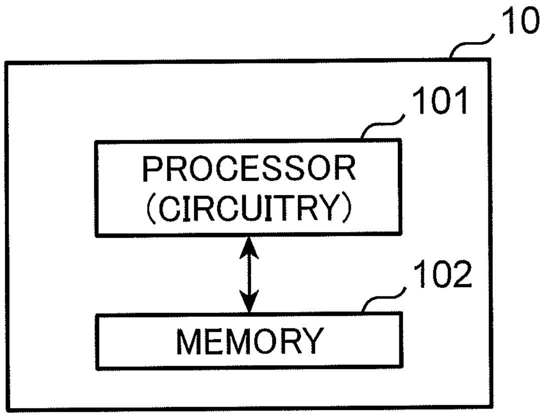
FIG. 17 is a view illustrating a simplified implementation example of the image encoding device.

FIG. 17 is a view illustrating a simplified implementation example of the image encoding device 10. The image encoding device 10 is configured to include a processor 101 and a memory 102 connected to the processor 101. However, the memory 102 may be included in the processor 101. The processor 101 is circuitry that performs information processing. The processor 101 includes a CPU or a GPU. The memory 102 includes a semiconductor memory such as a ROM or a RAM, a magnetic disk, or an optical disk. The memory 102 stores information necessary for the processor 101 to execute prefilter processing, encoding processing, and the like. For example, the memory 102 stores the image data D1 and D2 and the filter information D3. The memory 102 stores a program. By the processor 101 executing a program read from the memory 102, the processor 101 functions as the filter processing unit 11 and the encoding processing unit 12.

Figure 16:
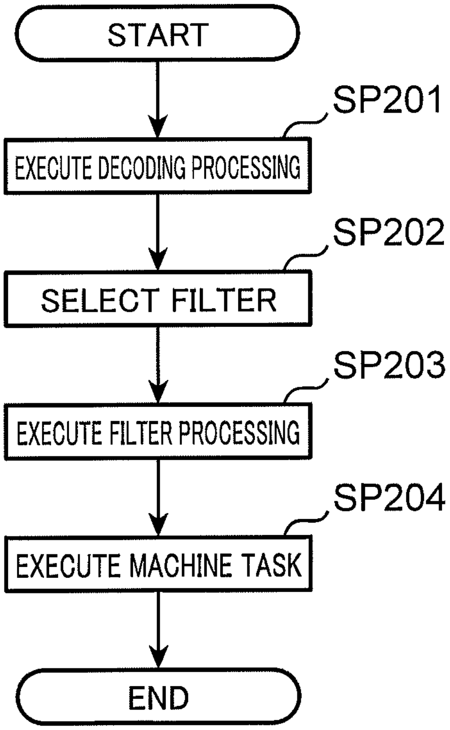
FIG. 16 is a flowchart showing a flow of processing executed by an image decoding device.

FIG. 16 is a flowchart showing the flow of processing executed by the image decoding device 20.

First, in step SP201, the decoding processing unit 21 receives the bitstream D4 from the image encoding device 10 via the network Nw, generates a first image by decoding the bitstream D4, and outputs the image data D5 of the first image. The decoding processing unit 21 acquires the filter information D6 by decoding the bitstream D4.

Next, in step SP202, based on the usage information D7, the filter processing unit 22 selects one first filter set from a plurality of first filter sets indicated by the first filter set information D6*a*, one second filter from a plurality of second filters indicated by the second filter information D6*b*, and one parameter value from a plurality of parameter values indicated by the parameter value information D3*c*.

Next, in step SP203, the filter processing unit 22 generates the second image by applying the selected first filter set to the first image, and outputs the image data D8 of the second image.

Next, in step SP204, by using the second image indicated by the image data D8, the task processing unit 23 executes task processing in accordance with the usage information D7, and outputs the result data D9 such as an inference result.

Figure 18:
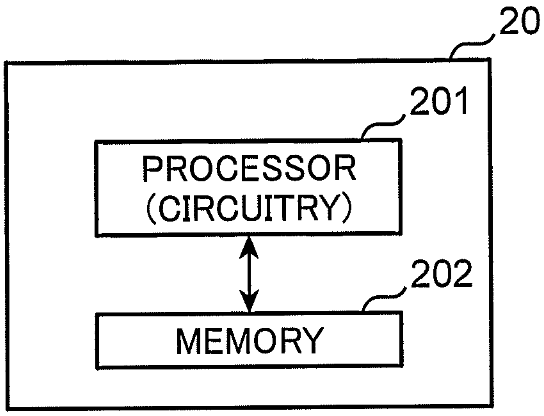
FIG. 18 is a view illustrating a simplified implementation example of the image decoding device.

FIG. 18 is a view illustrating a simplified implementation example of the image decoding device 20. The image decoding device 20 is configured to include a processor 201 and a memory 202 connected to the processor 201. However, the memory 202 may be included in the processor 201. The processor 201 is circuitry that performs information processing. The processor 201 includes a CPU or a GPU. The memory 202 includes a semiconductor memory such as a ROM or a RAM, a magnetic disk, or an optical disk. The memory 202 stores information necessary for the processor 201 to execute decoding processing, postfilter processing, task processing, and the like. For example, the memory 202 stores the bitstream D4, the image data D5 and D8, and the filter information D6. The memory 202 stores a program. By the processor 201 executing a program read from the memory 202, the processor 201 functions as the decoding processing unit 21, the filter processing unit 22, and the task processing unit 23.

According to the present embodiment, the first filter set applied to the first image can be dynamically changed in accordance with the image usage such as each machine task or human vision. This enables an optimum filter set to be selected and designated in accordance with image properties required for each image usage. Depending on the image usage, by removing unnecessary information from an image to be transmitted to the bitstream D4, it is possible to reduce a transmission code amount from the image encoding device 10 to the image decoding device 20.

The first filter to be applied to the first image can be dynamically selected from the first filter set based on the feature value of the first image obtained by application of the second filter.

The present disclosure is particularly useful for application to an image processing system including an image encoding device that transmits an image and an image decoding device that receives an image.

The invention claimed is:

1. An image decoder comprising:
- circuitry; and
- a memory connected to the circuitry,
- wherein the circuitry, in operation:
  - acquires a first image and information related to multiple first filters from a bitstream;
  - selects, based on information indicating an image usage, one first filter from the multiple first filters; and
  - generates a second image by applying the first filter to the first image,
- wherein the image usage includes at least one machine task and human vision which includes human viewing of video.

2. The image decoder according to claim 1, wherein the one first filter is a bypass filter that outputs the first image as the second image.

3. The image decoder according to claim 1, wherein
- the circuitry acquires, from the bitstream received from an image encoder, a postfilter as the one first filter, the postfilter corresponding to a prefilter applied to an input image by the image encoder.

4. The image decoder according to claim 1, wherein
- the circuitry acquires, from the bitstream received from an image encoder, a prefilter applied to an input image by the image encoder, and
- the circuitry acquires, as the one first filter, a postfilter corresponding to the prefilter by converting the prefilter.

5. The image decoder according to claim 1, wherein the circuitry acquires the one first filter from a header of the bitstream.

6. The image decoder according to claim 5, wherein
- the header has a supplemental enhancement information (SEI) region, and
- the circuitry acquires the multiple first filters from the SEI region.

7. An image encoder comprising:

circuitry; and a memory connected to the circuitry, wherein, the circuitry, in operation:

generates a first image by applying a prefilter to an input image in accordance with an image usage; and generates a bitstream by encoding the first image and information related to multiple first filters including the prefilter or a postfilter corresponding to the prefilter, the image usage includes at least one machine task and human vision which includes human viewing of video, the image usage is an image usage in an image decoder, and the circuitry transmits the bitstream to the image decoder.

8. An image decoding method comprising:

acquiring a first image and information related to multiple first filters from a bitstream;

selecting, based on information indicating an image usage, one first filter from the multiple first filters; and generating a second image by applying the one first filter to the first image, wherein the image usage includes at least one machine task and human vision which includes human viewing of video.

9. An image encoding method comprising:

generating a first image by applying a prefilter to an input image in accordance with an image usage; and generating a bitstream by encoding the first image and information related to multiple first filters including the prefilter or a postfilter corresponding to the prefilter, wherein the image usage includes at least one machine task and human vision which includes human viewing of the video, the image usage is an image usage in an image decoder, and the image encoding method further comprising transmitting, by an image encoder, the bitstream to the image decoder.

* * * * *